United States Patent
Bates et al.

(10) Patent No.: US 6,789,107 B1
(45) Date of Patent: Sep. 7, 2004

(54) METHOD AND APPARATUS FOR PROVIDING A VIEW OF AN ELECTRONIC MAIL MESSAGE

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/564,007

(22) Filed: May 3, 2000

(51) Int. Cl.[7] .............................................. G06F 13/00
(52) U.S. Cl. ..................... 709/206; 709/203; 709/217
(58) Field of Search ............................... 709/206, 201, 709/219, 204, 200, 217, 218, 225, 227, 238, 203

(56) References Cited

U.S. PATENT DOCUMENTS

| | | | | |
|---|---|---|---|---|
| 6,122,632 A | * | 9/2000 | Botts et al. ................... | 707/10 |
| 6,192,396 B1 | * | 2/2001 | Kohler ........................ | 709/206 |
| 6,195,679 B1 | * | 2/2001 | Bauersfeld et al. ......... | 709/203 |
| 6,247,045 B1 | * | 6/2001 | Shaw et al. .................. | 709/207 |
| 6,289,372 B1 | * | 9/2001 | Vyaznikov .................... | 709/206 |
| 6,393,423 B1 | * | 5/2002 | Goedken ....................... | 707/10 |
| 6,484,196 B1 | * | 11/2002 | Maurille ..................... | 709/206 |
| 6,529,942 B1 | * | 3/2003 | Gilbert ........................ | 709/206 |

* cited by examiner

Primary Examiner—Moustafa M. Meky
(74) Attorney, Agent, or Firm—Moser, Patterson & Sheridan, LLP

(57) ABSTRACT

A method, an article of manufacture and apparatus for providing a historical view or map window of an electronic mail (e-mail) message having a chain of component sections or messages therein. Specifically, the method displays a historical view with a list of identifiers. Each identifier in the view is associated with a particular component section or message in the e-mail message. As such, a recipient of the e-mail message can access a particular component message by clicking or activating its associated identifier. The recipient can also flag or determine the important component messages or sections that are highlighted on the display. Additionally, the recipient can select which component messages to include or mark as important in a subsequent reply or forward message.

28 Claims, 5 Drawing Sheets

METHOD AND APPARATUS FOR PROVIDING A VIEW OF AN ELECTRONIC MAIL MESSAGE

BACKGROUND OF THE INVENTION

1. Field of the Invention

The present invention generally relates to electronic mail systems and, more particularly, the invention relates to a method, an article of manufacture and apparatus for providing a historical view of an electronic mail (e-mail) message.

2. Background of the Related Art

In today's electronic mail (e-mail) environment, many users either reply or forward the entire contents of a received e-mail message. This "reply with history" feature is used to communicate the flow of ideas to many people. However, the use of the reply with history feature often leads to e-mail containing very large chains of component messages.

The recipient of this e-mail usually requires additional time to search and determine the important portions or sections within the very large chains of component messages. When a particular user receives many of these e-mails with large chains of component messages, then the extra time spent searching and determining important sections of these e-mails results in lost time and productivity in a business environment.

Therefore, a need exists in the art for a method, an article of manufacture and apparatus for displaying electronic mail chains in an efficient manner.

SUMMARY OF THE INVENTION

The present invention provides a method, an article of manufacture and apparatus for providing a historical view or map of an electronic mail (e-mail) message that includes a chain of component sections or messages. Specifically, the invention provides a method, as well as a concomitant apparatus and article of manufacture of providing a historical view of an electronic mail message having a plurality of sections comprising opening the electronic mail message, identifying the plurality of sections in the opened electronic mail message and displaying the historical view having a plurality of identifiers; where each identifier in the plurality of identifiers is provided for each section in the identified plurality of sections.

In another aspect of the invention, a method for viewing an electronic mail message having a plurality of sections comprises opening the electronic mail message; determining the plurality of sections in the opened electronic mail message; displaying a historical view having a plurality of identifiers, wherein each identifier in the plurality of identifiers is provided for each section in the determined plurality of sections; and activating at least one identifier in the plurality of identifiers to view the determined plurality of sections associated with the plurality of identifiers that are activated.

In still another aspect of the invention, a method for altering a historical view upon sending an electronic mail message comprises opening a historical view associated with an electronic mail message; selecting portions of the historical view that are to be contained in a new electronic mail message; and creating said new electronic mail message comprising a historical view containing the selected portions of the historical view. In one embodiment, the historical view comprises a plurality of identifiers, wherein each identifier in the plurality of identifiers is provided for each section in of an electronic mail message. The identifiers may comprise user identification and subject information.

In yet another aspect of the invention, a method of creating an electronic mail message comprises receiving a first electronic mail message comprising at least one historical section; creating a second electronic mail message; and creating a historical view for said second electronic mail message comprising identifiers representing said at least one historical section.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE PREFERRED EMBODIMENT

Figure 1:
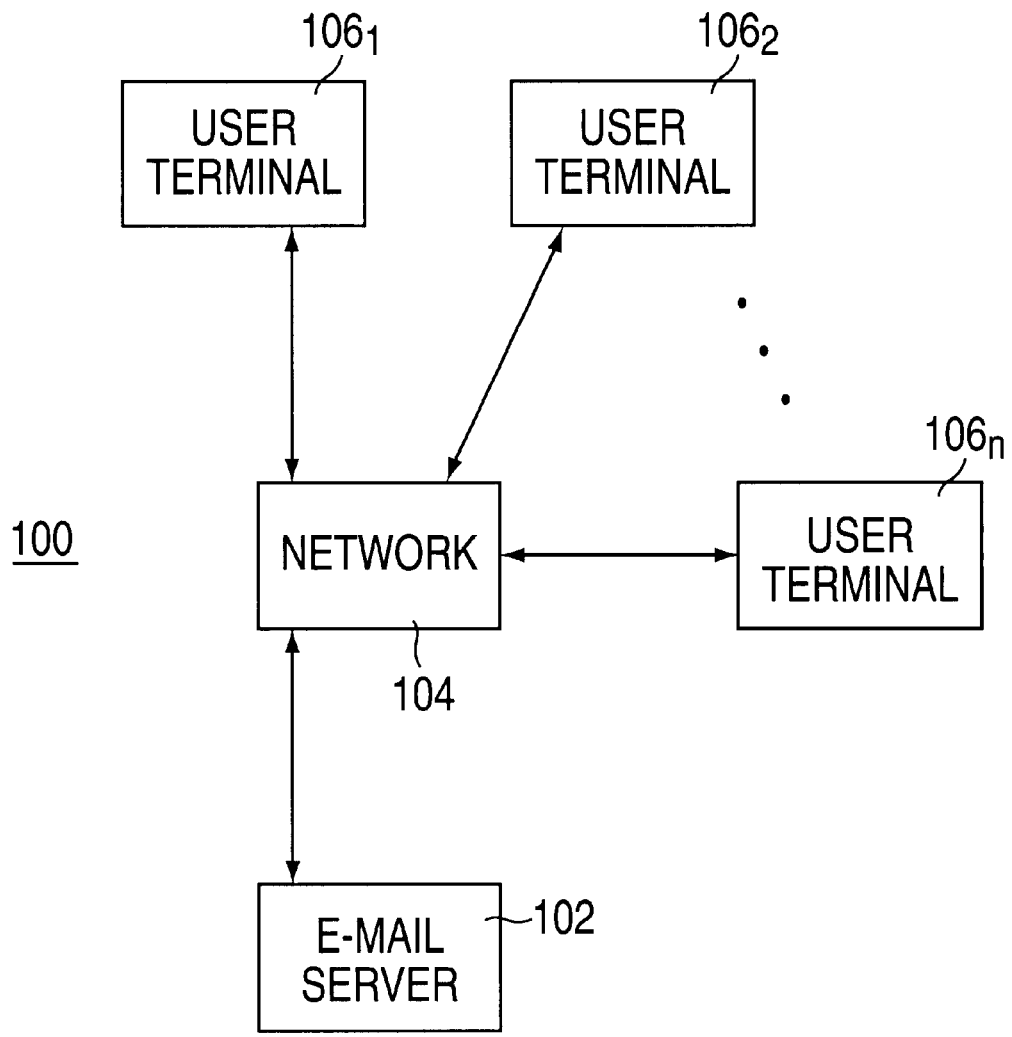
FIG. 1 depicts a simplified block diagram of an electronic mail system that benefits from the present invention.

FIG. 1 depicts an electronic mail (e-mail) system 100 that benefits by use of the present invention. The system 100 comprises an e-mail server 102, a network 104 and a plurality of user terminals $106_1, 106_2, ... 106_n$. The user terminals 106 may include data processing systems, e-mail terminals, e-mail enabled network appliances and the like. The present invention is embodied as an executable software routine(s) that generally resides within the user terminals 106. The user terminals 106 are connected to one another through the network 104 and also connected through the network 104 to the e-mail server 102. The e-mail server 102 provides e-mail services to all of the user terminals 106 such that e-mail addressed from one terminal to another is routed through the network 104 to the e-mail server. The e-mail server 102 then properly addresses the e-mail to an appropriate user terminal 106. Although the system is shown having a hub and spoke configuration, other forms of networks may also benefit from the invention.

In addition to conventional e-mail messages, the system 100 routes control messages to the user terminals 106. The user terminal 106 processes these control messages to determine an important section or sections within the e-mail message. The control messages are handled and routed by the system 100 in a similar manner as conventional e-mail. For e-mail messages containing a large plurality or chain of component messages, the user terminal 106 provides a map view containing a list of the component messages with an indication of important sections or important component messages. This feature allows a recipient of an e-mail message that contains many component messages to navigate among the chain of messages and only read the important component messages.

Figure 2:
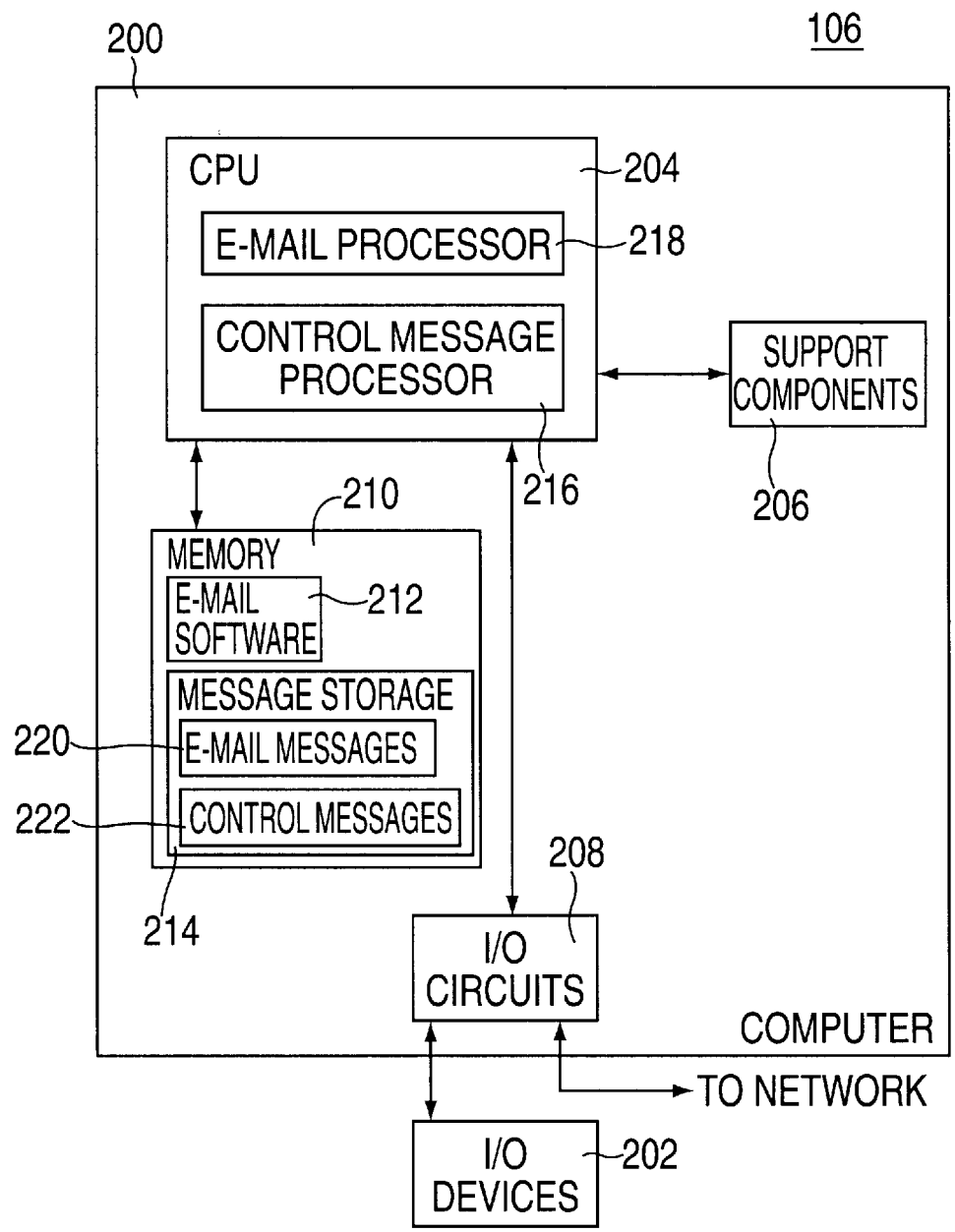
FIG. 2 depicts a simplified block diagram of a user terminal (computer) within the electronic mail system of FIG. 1.

FIG. 2 depicts a user terminal 106, e.g., a general purpose computer. User terminal 106 comprises a computer 200 and an input/output device or devices 202 such as a monitor, a keyboard, a mouse, a trackball and the like. The computer 200 comprises a central processing unit 204, support components 206, input/output circuits 208 and a memory 210. The memory 210 may be a solid state memory, a disc drive, an optical memory, a removable memory device, or a combination of any of these memory devices. The input/output circuits 208 provide a well-known interface from the CPU 204 to the I/O devices 202. The support components 206 are well known in the art and include such components as cache, power supplies, clock circuits, and the like. The combination of all of these components and elements forms a general purpose computer that, when executing a particular software package or routine, becomes a specific purpose computer. In this case, the CPU 204 when executing the electronic mail processing software 212 of the present invention operates as an e-mail processor 218 as well as a control message processor 216. The e-mail software 212 resides in memory 210. In addition, the electronic mail messages 220 and the control messages 222 are stored in a message storage 214 within the memory 210. In addition, the I/O circuits 208 generally contain a network interface card or modem that couples the computer to the network of FIG. 1 such that electronic mail messages can be routed to and from the computer 200.

As will be described in detail below, one embodiment of the invention is implemented as a program product for use with a computer system such as, for example, the system 100 shown in FIG. 1. The program(s) of the program product defines functions of the preferred embodiment and can be contained on a variety of signal/bearing media, which include, but are not limited to, (i) information permanently stored on non-writable storage media, (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. Such signal-bearing media, when carrying computer-readable instructions that direct the functions of the present invention, represent embodiments of the present invention.

The e-mail processor 218 and the control message processor 216 operate to receive e-mail messages and control messages, process the messages, and display a map view for each received e-mail message having a plurality or chain or component messages. The map view provides a list of all component messages within the e-mail message, where the important component messages or sections are flagged or highlighted. These important messages are highlighted in response to control messages associated with the e-mail message. If the control messages are sent separately from the associated e-mail message, the control processor 216 uses the control messages to determine the important sections or component messages within the e-mail message. Alternatively, if the control messages are embedded in the header of the e-mail message, the e-mail processor 218 parses the control messages from the e-mail message. The control messages are then used to identify the important sections or component messages.

Figure 3:
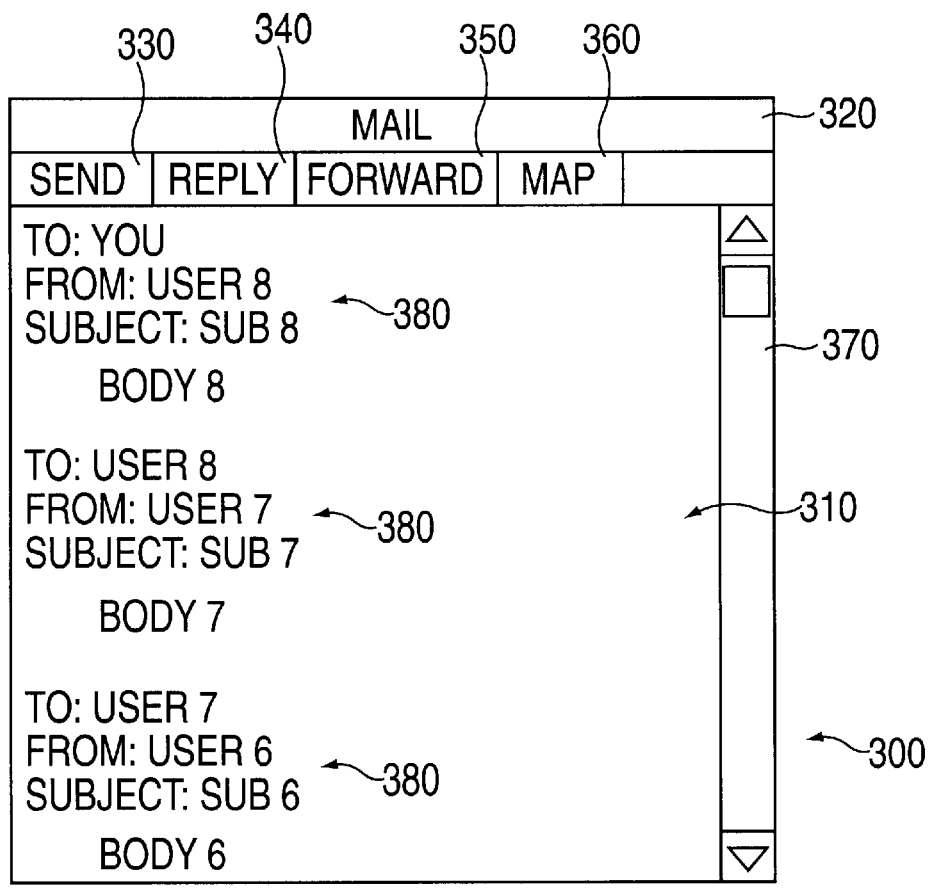
FIG. 3 depicts an e-mail message that is displayed on a terminal.
Figure 4:
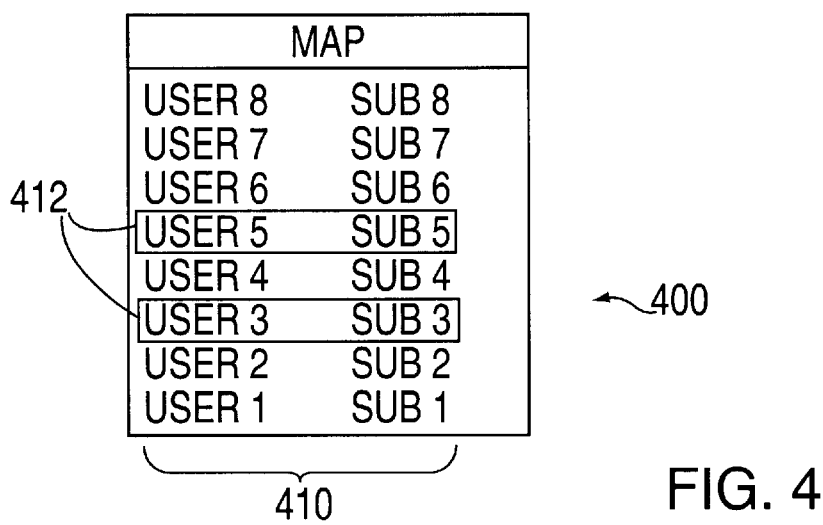
FIG. 4 depicts a map view for the e-mail message of FIG. 3.
Figure 5:
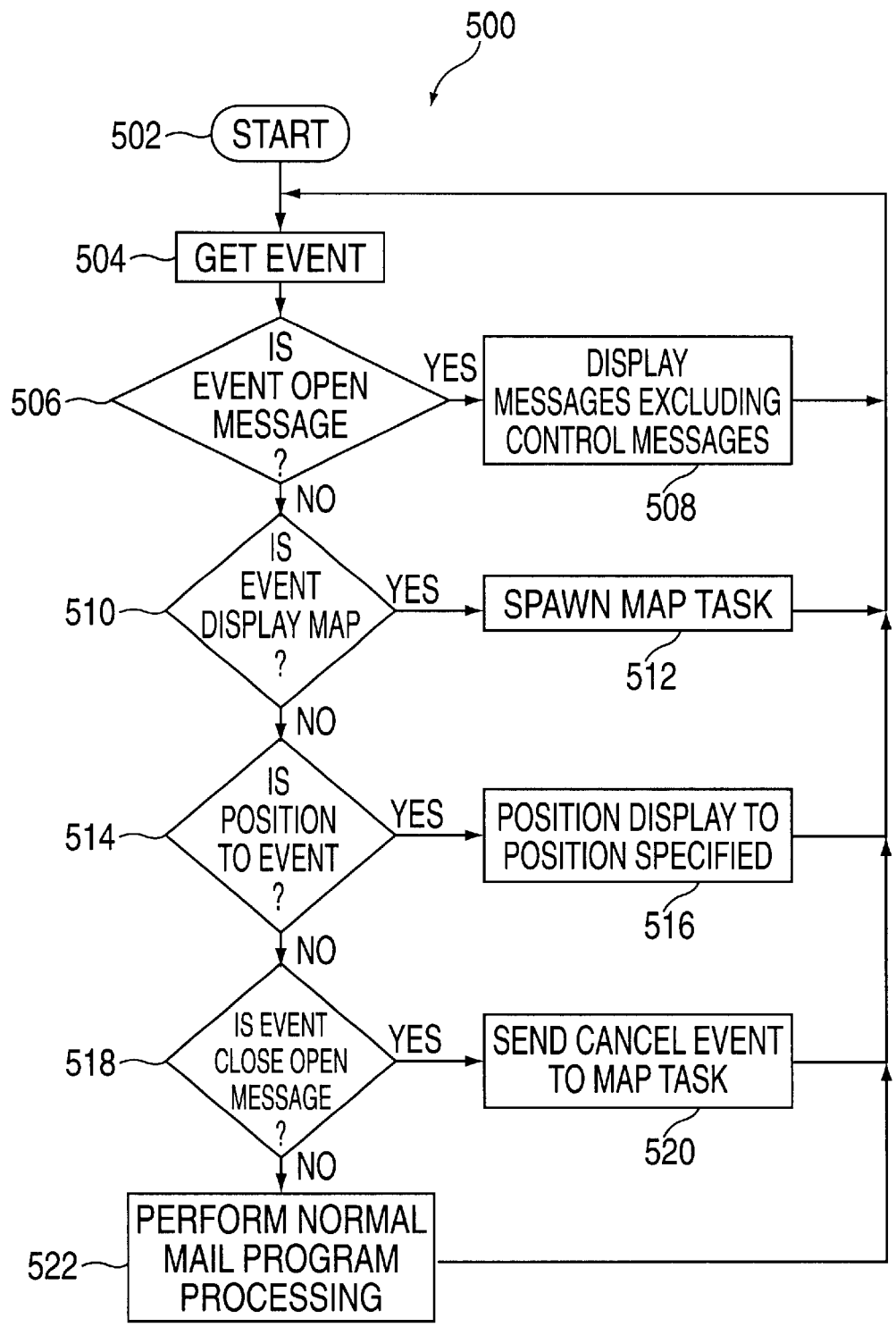
FIG. 5 depicts a flow diagram for a mail program used for implementing the e-mail message processing of the present invention.

FIG. 3 depicts a mail view or mail window 300 associated with an e-mail message 310. FIG. 4 depicts a map view or map window 400 associated with the email message 310 of FIG. 3. FIG. 5 depicts a flow diagram 500 of a mail program used for implementing the e-mail message 310. To best understand the invention, the reader should simultaneously refer to FIGS. 3–5.

The mail window 300 is displayed on the terminal (specifically, on the I/O device 202, which may include a display device) once the e-mail message 310 is opened. Specifically, the mail window 300 depicts an e-mail message 310, a title bar 320, a send button 330, a reply button 340, a forward button 350, a map button 360 and a vertical scroll bar 370. The e-mail message 310 often includes a chain or plurality of component messages 380 previously sent, forwarded or replied among different users. Each component message 380 includes information relating to the sender (username, user identification and the like), recipient or reader, title and body. The component message 380 generally) includes other information such as header information (not shown).

The recipient of the e-mail message 310 may use the send button 330, reply button 340 and forward button 350 to respectively send, reply and forward mail to other users in a conventional manner. Use of reply button 340 and forward button 350 may further add to the chain of component messages 310 received by the next receiver. The scroll bar 370 is used to view different portions of the e-mail message 310 or a particular component message 380.

The recipient can also use the map button 360 that causes the e-mail processor 218 to launch a map task routine. Upon executing this map task routine, the e-mail processor 218 displays a map view or map window 400 embodied in the invention. FIG. 4 depicts a map view 400 that comprises a plurality of component message identifiers 410, where each identifier 410 provides information associated with the component message 380, i.e., user identification and subject of the message. As such, the map view 400 represents a list or outline of the contents or component messages 380 within the e-mail message 310. The map view 400 can be displayed at the top of the e-mail message 310, i.e., above the component messages 380, or can be displayed in a window separate from the e-mail message 310.

The map view 400 provides the recipient with a simple history of the component messages 380 within the e-mail message 310. The identifiers 410 of the component messages 380 are generally ordered in some manner, i.e., by time or by user. Component messages 380 or sections that are identified as important are highlighted or otherwise rated, i.e., using an importance indicator represented by rectangle 412.

The recipient may utilize the map view 400 to navigate the desired sections or component messages 380. For example, the recipient can view a specific section or component message 380, by simply clicking on its associated identifier 410. This avoids the need to scroll through a potentially long chain of messages or sections within the e-mail message 310.

The recipient may also utilize the map view 400 to flag or review component messages 380 that are identified as important. For example, the sender of the e-mail message 310 could have identified three messages in a chain of twenty messages as important, i.e., the messages cover an important topic or are written by a supervisor. In this case, the recipient may simply flag or access these three important messages by clicking on the associated identifiers 410, instead of scrolling through the entire e-mail message 310.

Additionally, the recipient may use the map view 400 to selectively forward or reply to specific portions or component messages 380 to another user. Namely, the recipient can edit the e-mail message 310 while creating a reply message or a forward message. The recipient may include particular component messages or sections 380 or highlight important component messages or sections 380, by selecting or marking check boxes (not shown) corresponding to each identifier 410 and its associated message or section 380.

The map view 400 can be used to implement "send-to-specific" highlights, i.e., the highlighting of different sections 410 to specific users. For example, if the recipient replies to or forwards the e-mail message 310 to three people on a distribution list, the recipient can highlight a first section in red, a second section in blue and a third section in green. The recipient can determine which section to highlight with respect to a particular person or user, by simply checking a check box for each section on the map view 400 and applying that section to the particular person or user selected. This allows each person to see who was highlighted for each section.

FIG. 5 depicts a method for implementing a mail program in accordance with one embodiment of the present invention. The method 500 is entered at step 502 and proceeds to step 504, where the method 500 retrieves an event. Such events may represent a particular command from the recipient of the e-mail message 310. The method 500 operates in an event driven manner, i.e., the method 500 retrieves events and performs different steps depending on a particular event retrieved.

At step 506, the method 500 queries whether the event is to open a received message. If the event requests a message to be opened, the method 500 proceeds to step 508, where the message window is displayed on the terminal. Control words associated with the mail message are generally not displayed. After displaying the message window at step 508, the method 500 proceeds to step 504 to retrieve the next event. If the event is not to open a received message, then the method 500 proceeds to step 510.

The step at 510 is to query whether the event is to display the map view or map window 400 of the e-mail message 310. Namely, the query is asking whether the map button has been activated. If the event is to display the map, then the method 500 proceeds to step 512. At step 512, the method 500 launches a map task. This map task is further described with respect to FIG. 6. After launching the map task at step 512, the method 500 proceeds to step 504 to retrieve the next event.

If the event is not to display the map view 400, then the method 500 proceeds to the next query at step 514. This query determines whether a particular position of the mail message has been identified. Preferably, the recipient may identify the position to view in the e-mail message 310 by selecting an identifier 410 in the map associated with a particular component message or section 380. The recipient may also specify the position in the e-mail message 310 by either moving the vertical scroll bar and/or moving a position indicator from an input device. If the position of the e-mail message 310 is specified, the method 500 proceeds to step 516, where the display is adjusted to the specified position. After adjusting the display at step 516, the method 500 proceeds to step 504 to retrieve the next event. If the current event is not to specify the position of the e-mail message 310, then the method 500 proceeds to step 518.

At step 518, the method 500 queries whether the event is to close the e-mail message 310. If the e-mail message 310 is to be closed, then the method 500 proceeds to step 520, where the method 500 sends a command to cancel the map task. After sending this command, the method 500 proceeds to step 504 to retrieve the next event. If the e-mail message is to remain open, i.e., there is no event to close the e-mail message 310, then the method 500 proceeds to step 522, where normal mail program processing is performed, i.e., message forward, reply, edit and the like.

Figure 6:
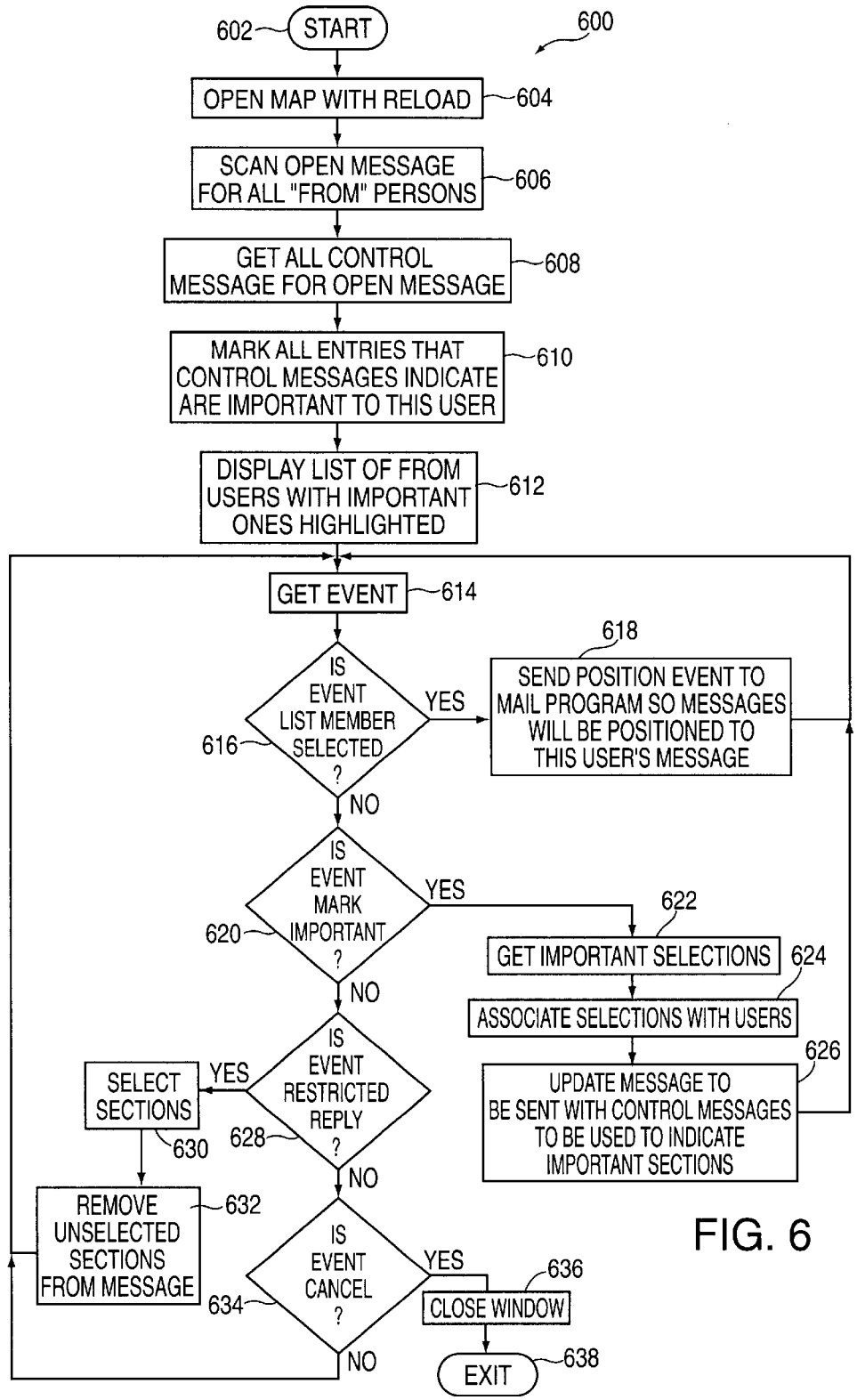
FIG. 6 depicts a flow diagram for a map task used for implementing the map view.

FIG. 6 depicts a detailed flow diagram of step 508 wherein the method 500 implements a map task method 600 embodied in the invention. The method 600 is entered at step 602 and proceeds to step 604, where the map view or map window 400 is opened. This map view 400 can be provided at the top of the message window 300. Alternatively, the map view 400 can be provided separately from the message window 300. At step 606, the method 600 scans the open e-mail message 310 to find all the previous senders, i.e., users designated after "from" in the message. The method 600 then obtains all control messages associated with important sections 380 of the opened e-mail message 310 at step 608 before proceeding to step 610.

At step 610, the method 600 marks all component messages or entries 380 that control messages indicate are important to the recipient. For example, the previous sender may have marked certain portions or component messages 380 of the e-mail message 310 as important. The method 600 then proceeds to step 612, where the map view or map window 400 containing a list of component identifiers 410 is displayed. The important identifiers are flagged or highlighted on the display of the map view.

After displaying the map view 400 in step 612, the method 600 retrieves events for the map task in step 614. At step 616, the method 600 queries whether the event is to select an entry from the list of identifiers 410. Namely, step 610 queries whether the recipient desires to view a particular component message or section 380. If the event is to select an identifier 410, then the method 600 proceeds to step 618. At this step 618, the method 600 sends the position information as an event to the mail program or method 500. In turn, the display is adjusted in step 516 to the position of the message associated with the selected sender. The method 600 proceeds to step 614 to retrieve the next event.

If the event does not involve selecting an identifier 410, then the method 600 proceeds to step 620. At step 620, the method 600 queries whether the event is having sections marked or selected as important. For example, the recipient may mark or select particular sections as important before forwarding or replying to the e-mail message 310.

If the event is to mark or select a particular section or component message 380 as important, then the method 600 proceeds to retrieve sections from the e-mail message 310 at step 622. The method 600 then proceeds to step 624 where a user may identify sections of the e-mail message 310 as important and to associate important sections of the e-mail message 310 with corresponding users. At step 626, the method 600 updates the e-mail message 310 to be sent using control messages to indicate the important sections 380 for each particular user. The method 600 then proceeds to step 614 to retrieve the next event.

If the process does not involve the selection of a particular message or section 380 as important, then the method 600 proceeds to step 628 to query whether the event is a "restricted reply event" by the recipient. A restricted reply event occurs when a user selects a "restricted reply" that prepares a reply e-mail message that contains less than all the component messages. As such, the reply message can be tailored to the needs of a particular recipient. The restricted reply function can be used to created restricted forward messages as well. If the event is a restricted reply event, then the method 600 processes the selected portions of the e-mail message 310 at step 630 and removes unselected portions of the e-mail message 310 at step 632. The method 600 then proceeds to step 614 to retrieve the next event.

If the event is not a restricted reply event, then the method 600 proceeds to step 634 to query whether the event is to cancel the map task. If the event requires canceling the map task, then the method 600 proceeds to close the map window at step 636 and exit the method 600 at step 638. After leaving method 600 via step 512, the method 500 returns to step 504. If the event does not involve cancellation of the map task, the method 600 proceeds to step 614 to retrieve the next event.

Although various embodiments which incorporate the teachings of the present invention have been shown and described in detail herein, those skilled in the art can readily devise many other varied embodiments that still incorporate these teachings.

What is claimed is:

1. A method, implemented by a computer, for providing a view of an electronic mail message, comprising:

opening the electronic mail message sent from a first user and received by a second user and comprising a plurality of sections each comprising a component message sent from a user and associated component message identifying information which at least identifies the user responsible for sending the component message, wherein the plurality of sections comprises at least: (i) a first component message from the first user and associated component message identifying information and (ii) a second component message from at least one other user and associated component message identifying information;

displaying the opened electronic mail message;

identifying the plurality of sections in the opened electronic mail message; and displaying a historical view having a plurality of identifiers, where each identifier in the plurality of identifiers is provided for each section in the identified plurality of sections.

2. The method of claim 1 wherein the identifying step comprises:

analyzing address fields within the component message Identifying information of the plurality of sections of the electronic mail message.

3. The method of claim 1 wherein the identifying step comprises:

determining a number of from: fields in the component message identifying information of the plurality of sections of the opened electronic mail message.

4. The method of claim 1 wherein each identifier in the plurality of identifiers allows a recipient of the electronic mail message to access one section in the plurality of sections in the electronic mail message.

5. The method of claim 1 wherein each identifier in the plurality of identifiers comprises user identification and subject information.

6. The method of claim 1 wherein the plurality of identifiers are displayed in time-ordered manner.

7. The method of claim 1 wherein each section in the plurality of sections is included in a forward or reply message if the identifier associated with each section in the plurality of sections is selected.

8. The method of claim 1 further comprising the step of marking one or more identifiers associated with each section in the plurality of sections as being important where each marked section in the plurality of sections is highlighted in a forward or reply message.

9. The method of claim 1 wherein the historical view is displayed at top of the electronic mail message.

10. The method of claim 1 wherein the historical view is displayed in a separate window from the electronic mail message.

11. The method of claim 1 further comprising:

receiving at least one control message associated with the opened electronic mail message, where each control message is associated with one section in the plurality of sections; and highlighting at least one identifier in the plurality of identifiers for the each section in the plurality of sections associated with each control message.

12. The method of claim 11 wherein the at least one control message is inserted in a header of the electronic mail message.

13. The method of claim 11 wherein the at least one control message and the electronic mail message are separate messages.

14. The method of claim 1, further comprising navigating to a corresponding section in response to a user selection of a respective identifier of the plurality of identifiers.

15. The method of claim 1 wherein each identifier in the plurality of identifiers comprises at least a portion of the component message identifying information of the plurality of sections.

16. A method, implemented by a computer, for displaying an electronic mail message comprising:

opening the electronic mail message sent from a first user and received by a second user and comprising a plurality of sections each comprising a component message sent from a user and associated component message identifying information which at least identifies the user responsible for sending the component message;

displaying the opened electronic mail message;

determining the plurality of sections in the opened electronic mail message;

displaying a historical view having a plurality of identifiers, where each identifier in the plurality of identifiers is provided for each section in the determined plurality of sections; and activating at least one identifier in the plurality of identifiers to view one of the determined plurality of sections associated with the activated at least one identifier.

17. The method of claim 16 further comprising:

receiving at least one control message with the opened electronic mail message, where each control message is associated with one section in the plurality of sections; and highlighting at least one identifier in the plurality of identifiers for the plurality of sections associated with each control message.

18. The method of claim 17 wherein the at least one identifier in the plurality of identifiers in the activating step is the same as the at least one identifier in the plurality of identifiers in the highlighting step.

19. A method, implemented by a computer, for creating electronic mail messages comprising:

opening a first map view associated with a first electronic mail message comprising a plurality of sections each comprising a component message and associated identification information identifying at least a sender, a recipient and a subject of the associated component message, wherein the first map view provides an abstracted view of the first electronic mail message with respect to the plurality of sections in which at least a portion of the associated identification information of each section is shown without the associated component message;

selecting portions of the first map view that are to be contained in a second electronic mail message; and creating the second electronic mail message comprising a second map view containing the selected portions of the first map view.

20. A method, implemented by a computer, for creating an electronic mail message comprising:

receiving a first electronic mail message comprising:

a plurality of sections each comprising a component message and associated identification information identifying at least a sender, a recipient and a subject of the associated component message;

a first historical section excluding the component messages and defined by at least a portion of the associated identification information for each component message;

creating a second electronic mail message comprising the plurality of sections of the first electronic mail message and a new component message and associated identification information; and creating a second historical section for the second electronic mail message, the second historical section comprising the first historical section and the associated identification information of the new component message.

21. The method of claim 20 wherein the associated identification information of the first and second historical sections comprise at least one of sender identification, recipient identification and subject information.

22. The method of claim 20 further comprising selecting one or more portions of the associated identification information of the first historical section to be contained in the second historical section.

23. The method of claim 20 further comprising creating a control message that is associated with said second electronic mail message.

24. The method of claim 20 wherein said second electronic mail message is a forward or reply electronic mail message.

25. A terminal for providing a historical view of an electronic mail message having a plurality of sections comprising:

a memory for storing an electronic mail message and a mapping routine;

a processing unit, coupled to the memory, for retrieving the electronic mail message from the memory and opening the retrieved electronic mail message upon a command from an input device, and which, when configured with the mapping routine, determines the plurality of sections in the electronic mail message, and provides an identifier for each section in the plurality of sections; and a display device, coupled to the processing unit, for displaying the historical view comprising the identifiers for each section, the identifiers each comprising a user identification and a subject.

26. A computer readable medium storing a software program that, when executed by a computer, causes the computer to perform a method comprising:

opening an electronic mail message sent from a first user and received by a second user and comprising a plurality of sections each comprising a component message sent from a user and associated component message identifying information which at least identifies the user responsible for sending the component message, wherein the plurality of sections comprises at least: (i) a first component message from the first user and associated component message identifying information and (ii) a second component message from at least one other user and associated component message identifying information;

displaying the opened electronic mail message;

determining the plurality of sections in the opened electronic mail message; and displaying a historical view of the electronic mail message, the historical view having a plurality of identifiers, each identifier in the plurality of identifiers is provided for each section in the plurality of sections.

27. The computer readable medium of claim 26 wherein the method further comprises:

receiving at least one control message associated with the opened electronic mail message, where each control message is associated with one section in the plurality of sections; and highlighting at least one identifier in the plurality of identifiers for the each section in the plurality of sections associated with each control message.

28. The computer readable medium of claim 26 wherein each identifier in the plurality of identifiers comprises at least a portion of the component message identifying information of the plurality of sections.

* * * * *